US008827469B2

(12) United States Patent
Wiebking et al.

(10) Patent No.: US 8,827,469 B2
(45) Date of Patent: Sep. 9, 2014

(54) TWO-SIDED REFLECTOR AND TWO-SIDED TARGET OBJECT (75) Inventors: Mirko Wiebking, Heerbrugg (CH); Christian Schorr, Widnau (CH); Jürg Hinderlng, Marbach (CH)

(73) Assignee: Leica Geosystems AG, Heerbrugg (CH)

(*) Notice: Subject to any disclaimer, the term of this patent is extended or adjusted under 35 U.S.C. 154(b) by 1565 days.

(21) Appl. No.: 12/088,683

(22) PCT Filed: Sep. 18, 2006

(86) PCT No.: PCT/EP2006/009046
§ 371 (c)(1),
(2), (4) Date: Mar. 29, 2008

(87) PCT Pub. No.: WO2007/036309
PCT Pub. Date: Apr. 5, 2007

(65) Prior Publication Data
US 2008/0252958 A1    Oct. 16, 2008

(30) Foreign Application Priority Data
Sep. 29, 2005 (EP) .................................. 05108999

(51) Int. Cl.
*G02B 5/08* (2006.01)
*G02B 5/12* (2006.01)
*G01C 15/02* (2006.01)

(52) U.S. Cl.
CPC . *G02B 5/12* (2013.01); *G01C 15/02* (2013.01)
USPC .............................. 359/857; 359/527; 359/884

(58) Field of Classification Search
None
See application file for complete search history.

(56) References Cited

U.S. PATENT DOCUMENTS

| 4,470,664 A | 9/1984 | Shirasawa |
| 4,875,291 A | 10/1989 | Panique et al. |
| 5,231,539 A | 7/1993 | McMillen |
| 5,926,305 A * | 7/1999 | Ohtomo et al. ............ 359/196.1 |

FOREIGN PATENT DOCUMENTS

| JP | 9-033256 | 2/1997 |
| WO | 95/30879 | 11/1995 |

* cited by examiner

*Primary Examiner* — Jade R Chwasz
(74) *Attorney, Agent, or Firm* — Maschoff Brennan (57) ABSTRACT A two-sided reflector for the reflection of a diffraction-limited optical beam bundle is embodied such that a planar first and second reflection element such as, for example, a reflection film and a cat's eye reflector are arranged with respect to a reference axis of the reflector in such a way that an absolute addition constant of zero results from the targeted choice of the properties of the first and second reflection element and the arrangement thereof with respect to the reference axis for a distance measurement. The distance measurement therefore essentially corresponds to a distance measurement on a natural surface. The distance measurement can therefore be referred directly to the reference axis without additional correction.

16 Claims, 5 Drawing Sheets

TWO-SIDED REFLECTOR AND TWO-SIDED TARGET OBJECT

The invention relates to a two-sided reflector according to the precharacterising clause of claim 1 and a two-sided target object.

In surveying, measurements have for decades been carried out with rangefinders to reflectors for definition of the measured length, the reflectors being present in a specified position relative to a measuring point. In this way, the position of the rangefinder relative to the measuring point can be determined, if appropriate automatically, for example via the reflector. Electromagnetic waves emitted by these devices—for example laser beams in the infrared or visible wavelength range—are reflected back by the reflectors in a substantially directed manner to the device.

In order to achieve the required reliability and/or desired accuracy of geodetic measurements, a measuring point can be measured from more than one direction. This is typically also effected in the surveying and monitoring of long distances, in particular in construction of traffic routes, for example in the routing of railways or in the construction of road tunnels, in which measurements to one and the same measuring point from substantially opposite directions are carried out. A reflector apparatus which can be measured on both sides or even from all azimuthal directions is described, for example, in WO 95/30879.

In many systems of the prior art, two emission sources having different wavelengths—generally in the visible red and nonvisible infrared range—are currently used. The infrared beam is used for measurement to—generally hand-held—reflectors or reflecting foils as target objects or target plates. On the other hand, the visible emission is used in the measurements to surfaces of natural objects. This is because firstly the laser safety regulations permit higher transmitting powers in the visible wavelength range and secondly the measuring point sighted can be directly identified by the visible radiation on the natural object. For measurement to prisms or retroreflecting foils, the visible strong radiation is less suitable since, owing to the high reflectivity of the retroreflectors, the user at the device will be dazzled and will be irritated during the work. With a visible measuring beam in the pointer mode, the disturbance is even more substantial. Furthermore, during measurement to retroreflectors with a visible measuring beam—generally having a small divergence limited by diffraction—the measuring light is thrown back into the transmitter owing to the lack of beam divergence in the short distance range, which has an adverse effect on the accuracy of measurement. The use of emission sources optimised for reflectorless targets is therefore possible only over relatively large distances, e.g. from 500 m, owing to the pronounced retroreflection for prisms or retroreflecting foils.

If it is intended to survey objects or points at different distances from zero or short distance to more than 500 m and on different surfaces which are not necessarily provided by reflectors, two transmission units/emission sources, in particular two measuring beam divergences, and different reflectors have to be used in the prior art.

The use of different reflectors as target-marking objects or aids leads to different target type-specific (reflector-specific) distance offsets between the measured and the true distance. The correction required by the measuring technology is effected by inputting the respective reflector or addition constants. Owing to the spatial arrangement of the reflector surface relative to the reference axis of the distance measurement and/or optical effects due to the morphology of the surface, the measured distance has to be corrected. The change between the two transmission units also requires different addition constants which in turn differ for the different surfaces or reflector types. The handling of a plurality of both device-dependent and target object-dependent addition constants entails a multiplicity of possible errors and makes the method complex and time-consuming.

It has been necessary to date—in the case of a complex setup of the measuring device comprising two transmission units, in particular to wavelengths—either to accept these disadvantages or to effect a reduction to a wavelength in the infrared range, for example to avoid dazzling the user of the device, which however, for laser safety reasons, gives rise to limitations regarding the distances which can be surveyed and reduces the number of addition constants to be used but does not completely eliminate the need to take them into account.

In addition, there exists a multiplicity of rangefinders or geodetic devices having such rangefinders, which emit only a single diffraction-limited optical beam as a measuring beam. This is the case, for example, in devices which are designed for reflectorless measurements and which therefore use a beam having as low a beam cross-section and as high an intensity as possible owing to the lower reflectivity of the natural surfaces to which measurements are generally made. Such devices are thus specially designed and are equipped only with a single measuring beam for distance measurement, which measuring beam is optimised for reflectorless targets. This optimisation means as a rule a diffraction-limited beam having as small a beam cross-section as possible. In some applications, however, it is desirable also to be able to use a reflector for such devices having rangefinders designed for reflectorless measurement. For example, the accuracy of the measurement can be increased by a reflector as a target plate, especially because then the measuring location is also accurately defined, which is advantageous in particular in the case of medium and relatively large distances.

In addition, owing to their field of use for the surveying of natural surfaces, the devices are not designed for changeable addition constants, since no distance offset, i.e. no addition constant, occurs in the case of natural surfaces.

There is therefore the problem of providing a reflector which is suitable for an instrument but which is designed/optimised for reflectorless measurements, giving rise to requirements which are problematic for measurements using reflectors. In addition, the required geodetic accuracy of measurement is as a rule not present with a standard reflector. As already mentioned above, an accurate measurement is possible throughout only for distances from 500 m.

JP09033256 discloses a two-sided reflector which has two similar retroprisms. This apparatus has an addition constant which is not equal to zero and cannot be used for rangefinders designed for reflectorless measurement since the small beam cross-section thereof cannot be sufficiently accurately aligned over relatively large distances and cannot be aligned in a sufficiently stable manner with the retroprisms with their small cross-section. In addition, the achievable accuracy of measurement is only low owing to potential erroneous aiming of the laser beam having a small, diffraction-limited diameter. With a diffraction-limited laser beam, it is scarcely possible to strike the centre or the aperture of a single reflector with a single reflection centre. Furthermore, accurate aiming is continuously disturbed by air turbulence. Moreover, an adverse influence occurs when aiming at an azimuthal angle or angle of elevation differing from zero, owing to parallax. This disturbing effect is particularly pronounced in the case of standard retroprisms in the spatial arrangement described, with prism vertices on the axis to be marked.

U.S. Pat. No. 4,875,291A describes a reflector holder having 2 axes of rotation for orienting a two-sided target plate having only one mountable reflector. The target plate and a cardanic two-axis system are used for rough sighting, only the target plate having a two-sided form. The retroreflector on the other hand must be turned around. Owing to the stated limited angle range of retroreflectors, the cardanic orientation is particularly important.

U.S. Pat. No. 5,231,539A also discloses a conventional solution comprising a retroprism, in which the retroprism can be adjusted in a holder to the tripod axis. The addition constants are therefore no longer zero but the lateral position of the target plate defined by the nodal point is independent of the orientation of the reflector relative to the position of the rangefinder. The desired lateral point accuracy is achieved here at the cost of the addition constant.

U.S. Pat. No. 4,470,664 describes a reflector apparatus having an adjustable addition constant for rangefinders without an addition correction which can be adjusted or configured by means of software. Retroprisms can be placed and fixed at least two distances from the reference axis in a reflector holder. This reflector unit, too, is neither two-sided nor suitable for reflectorless rangefinders having a small diffraction-limited beam.

The object of the invention is to provide a reflector which permits accurate measurements of the generic type, in particular distance measurements, without addition constants having to be taken into account and managed.

A further object of the invention is to provide a reflector for measurements both at close range and at far range, comprising a single emission source, in particular a single emission wavelength.

A further object of the invention is to provide a reflector to which measurements can be made from a large range of azimuthal angles and angles of elevation.

A further object of the invention is to provide a reflector for devices comprising a radiation source emitting with diffraction limitation, such as, for example, in devices comprising rangefinders designed for reflectorless measurement.

According to the invention, these objects are achieved by the characterising features of claim 1 or of the dependent claims or the achievements are further developed.

A reflector according to the invention has a first and second reflection element comprising a first and second material having in each case a first and second refractive index and having in each case a first and second light lagtime, which reflection elements are arranged relative to a reference axis of the reflector. Depending on the refractive index, shape, thickness and arrangement of the reflection elements, an addition constant can be assigned to said reflection element—for a certain wavelength and/or divergence of optical beams. The addition constant is the value by which a distance measurement has to be corrected so that firstly the measuring beam covers a certain path in a material layer of the respective reflection element and not in air and secondly, owing to the spatial arrangement of the reflection elements, the reflection plane of the beams and reference plane of the distance measurement do not in general coincide. The end point or reference point of the distance to be measured is defined by the point of intersection of the sighting axis of the rangefinder with the reference plane on the object side.

Optical beams of specified wavelength and/or divergence which are directed at the reflector pass through a first and second passage area of the first and second reflection element, respectively, cover a certain distance in the first and second material and are finally reflected back—substantially in the direction of incidence. Of course, the reflection takes place if appropriate directly at the surface as in the case of mirrors as reflection elements.

The reference or end point of the distance measurements advantageously coincide—in particular in the case of two reflection elements—with the geometrical centre of gravity of the reflector. In the case of a reflector of planar design or planar reflection elements, the reference plane of the distance measurement is a plane through the reference point which is substantially parallel to the plane of the reflection elements—or a reflection plane thereof. An axis (perpendicular) through the reference point is referred to as reference axis. When measurements to the reference axis are defined below, "reference axis" can, if appropriate, be replaced by "reference plane"—for example in the case of planar reflection elements, which however is self-evident to persons skilled in the art.

Furthermore, the reference axis generally runs between first and second reflection element; if appropriate, however, the reflection elements may also be arranged side by side and before the reference axis.

According to the invention, in the case of a perpendicular orientation of the reference plane relative to the measuring beam, the arrangement of the reflection elements relative to the reference plane—and the reference axis—is such that the addition constant of the respective reflection element corresponds to the transit time of the beam in air from the reflection element to the reference plane and back: the transit time of the beam in the first and second material therefore corresponds to twice the transit time of the beam in air from the plane of the first and second passage area to the reference plane. In order for this condition to be fulfilled, the position of the reference plane—and hence also of the reference axis—and the materials of the two reflection elements are specifically chosen and tailored to one another. As a result of this development according to the invention, distance/transit time measurements to the reflection elements of the reflector—without distance correction—correspond in each case to measurements to the reference plane/reference axis. In the case of two identical reference elements, the reference axis advantageously passes through the—geometrical and/or gravitational—centre of the reflector or of the reflector arrangement. Distance measurements, based on the reference plane/reference axis, to the reflector according to the invention correspond—without distance correction—substantially to distance measurements to a natural target object.

In the case of reflectorless instruments, as are now used in the meantime as the main group of theodolites of the generic type, an addition constant of zero is a specific quantity since it corresponds to the distance offset of almost all natural target objects. In the case of these materials, the depth of penetration of the radiation is zero, which is not true for other, in particular artificial surfaces, such as, for example, Styropor. Devices designed for reflectorless measurement are therefore designed for this distance offset. A reflector which is intended to be used for such devices must take this into account.

If the reflector according to the invention has two—or more—different reflection elements, the respective reflection elements are generally arranged, according to the invention, at different distances from the reference axis so that measurements to the respective surface correspond to measurements to the reference axis. The position of the arrangement can be fixed by means of relationships known to persons skilled in the art. Parameters relevant for the determination are, for example, the refractive index of the reflector material, the path covered by the measuring beam in the material and the wavelength of the measuring beam. While the correction regarding the addition constant of the reflection element must be taken into account in the case of commercially available reflectors, according to the invention the reflector itself directly takes this into account. Because of the development according to the invention, the reflector or the reflector elements—having an addition constant of 0 mm has or have so to speak the properties of natural surfaces with regard to distance measurements. With this absolute addition constant of 0 mm, there is no need for a correction, so that measurements with beams of predetermined wavelength directly give measured distance values to the reference axis of the reflector in the evaluation method.

The reflector according to the invention has at least two planar reflection elements, optionally a plurality of said reflection elements. For flexible deployments, the reflector according to the invention can be provided with reflection areas of different design.

Owing to this extensive or planar design, in particular having a multiplicity of reflection points or reflection centres, i.e. as a two-dimensional arrangement of a multiplicity of apertures, in particular apertures or reflection points adjacent to one another and thus substantially covering the area, diffraction-limited beams with their small beam cross-section can also be used over relatively large distances. As a result of the design of the surfaces according to the invention, in particular as a result of the multiplicity of individual reflection points, such as, for example, of prisms or triple prisms, the beam is moreover homogenised during the reflection, which additionally increases the accuracy of the distance measurement. Owing to the many small prisms or reflection elements, the extensive target object produces an overlap or effective cross-section with the small, diffraction-limited laser beam. In the case of incorrect orientation, too, the extensive reflector is also efficiently struck.

Parallax errors have a substantially smaller effect in comparison with conventional solutions with retroprisms, since the distance of the surfaces from the reference axis is much smaller owing to the flat design of the reflection elements. Planar reflector surfaces can therefore be placed closer to the reference axis so that the addition constant is zero and at the same time the accuracy of the lateral position (horizontal/vertical) is high. The accuracy of the lateral position is determined by the lateral migration of the centre of gravity of the surface if the orientation in azimuth and elevation is not ensured. Owing to the thin, extensive character of the reflection elements, the lateral marking error to the reference axis is in the sub-mm to not more than the mm range and therefore still geodetically accurate. The particularly pronounced misalignment error—known in the case of incorrect sighting of individual prisms—does not occur owing to the homogenising optical effect by the planar reflection elements.

For applications with measurement identical on both sides, as is required, for example, inside tunnels, the reflector can be designed with two identical sides.

For other applications, it is advantageous if at least two sides having different reflection characteristics are present. One side is designed with a first reflection element having very high reflectivity for large distances, for example by means of cat's eyes, so that distances beyond 1000 m can also be measured. Cat's eyes, which consist, for example, of a multiplicity of small triple prisms or prisms arranged flat in a row, can be produced, for example, by the plastics injection moulding technique without great effort.

The other side is designed with a second reflection element of low reflectivity. The reflection coefficient of the two sides may differ by more than one order of magnitude. For example, the second reflection element can be designed with retroreflecting foils or tapes, for example with glass spheres or a diamond-like honeycomb structure. For example, bar- or line-like markings of the centre which are suitable for precise sighting during the day can also be applied to such foils. In the case of cat's eyes, such markings give rise to a plurality of reflection images with lateral offset, so that precise targeting is complicated and in certain circumstances the actual crosshairs are no longer unambiguously identifiable.

The combination of two surfaces having a cat's eye and reflecting foil permits adaptation to different measuring conditions.

By using such surfaces, it is possible to dispense with the use of a divergent laser beam in the distance measurement. While an offset occurs between incident and reflected beam in the case of conventional triple prism retroreflectors, depending on sighting, and—with non-divergent laser beams—the receiver is therefore often not struck, retroreflection occurs both on the foil and on the cat's eye without substantial beam offset, so that the receiver—in the case of a coaxial arrangement relative to the transmitter—is always struck. In addition, the back-scattered lobe is conical and conically divergent and the radiation strikes the receiver without problems.

The reflectivity ratio between cat's eye and foil can be specially tailored. Cat's eyes are available with a reflectivity of $>20\,000$ cd/lx/m$^2$, so that use for distance measurements up to 1000 m is possible without problems. For shorter distances, for example up to about 100 m, the retroreflecting foil can be used, the latter, with a reflection about 100 times weaker compared with the cat's eye, i.e. of about 200 cd/lx/m$^2$, giving optical receive signals which correspond to those of the cat's eye at larger distances, owing to the inverse proportionality of the distance law. Thus, operation of the distance-measuring unit with excessively weak or excessively strong signals is avoided, and furthermore the accuracy of the distance measurement is increased.

By means of such a design differing on the two sides, overmodulation of the distance-measuring unit in the close range can be avoided. The first reflection element, such as the reflection foil, can therefore advantageously be used in particular for measurements of short distances, for example up to a few 100 meters, whereas the second reflection element, e.g. the "cat's eye side", can be used for medium and long distances up to more than 1000 m.

With the use of foil/tape for the "close-range" side, a centre mark can be precisely applied to the entrance side of the foil/tape; for example, such marks can be printed on easily and without troublesome reflective influences, such as, for example, multiple images.

Another advantage is that the dazzle effect can be avoided, in particular at close range. In the case of rangefinders with visible radiation, the sighting of the cat's eye at short distances would dazzle the user and irritate him during the work, whereas, during sighting of the retroreflecting foil, the visible back reflection is considerably weaker and its brightness is adapted to the eye.

Suitable foils are available with reflectivities of 50 to 5000 cd/lx/m$^2$, it being possible in principle to distinguish between two commercially available types; versions comprising glass spheres and those comprising diamond or triple prism structures as retroreflectors. Foils comprising triple prism structures exhibit a periodic two dimensional grating, so that diffraction structures having a chromatic effect can form as a result. This effect results, inter alia, in mode selections which can lead to distance measuring errors. In the case of foils comprising glass spheres, the spheres are randomly distributed so that neither ordered diffraction effects nor relevant chromatic disturbances occur and the distance measurement remains uninfluenced thereby.

Of course, instead of reflective foils and cat's eyes, it is just as possible to use other known retroreflective means, such as, for example, triple prism retroreflectors. The reflector can likewise be formed with substantially the same elements of different reflectivity—for example two foils having different reflectivity. Furthermore, more than two reflection surfaces can be provided. Moreover, a spherical reflector can be formed according to the invention, the reflection elements, for example, being arranged adjacent to one another or being connected to one another. Of course, reflectors of any desired geometry can in principle be formed according to the invention.

With an at least two sided reflector which can be used in combination for the close distance and long distance measuring range, it is possible to carry out measurements over different distances with a single transmitting unit or with radiation of one wavelength range. By means of the reflection elements chosen appropriately with regard to reflection behaviour/reflectivity, it is possible to use one and the same transmitting and receiving device in combination with the reflector according to the invention for measurements to both close and remote distances of the generic type.

The necessity of integrating two transmitting/receiving devices for different beam divergences and/or wavelength ranges—for example a diffraction-limited laser in the visible wavelength range and a laser emitting divergent radiation in the infrared wavelength range—in a measuring device, such as a tacheometer, no longer exists with the two-sided reflector according to the invention. Thus, a significant cost reduction in the development of corresponding measuring devices is also achieved. Thus, for example, the two lasers in a tacheometer can be reduced to a single laser diode with a single, in particular diffraction-limited, beam collimation, preferably emitting in the visible or infrared wavelength range.

The two-sided reflector according to the invention is described in more detail purely by way of example below with reference to working examples shown schematically in the drawing. Specifically.

The size relationships in the diagrams of FIGS. 1 to 4 are not to be considered as being to scale.

Figure 1:
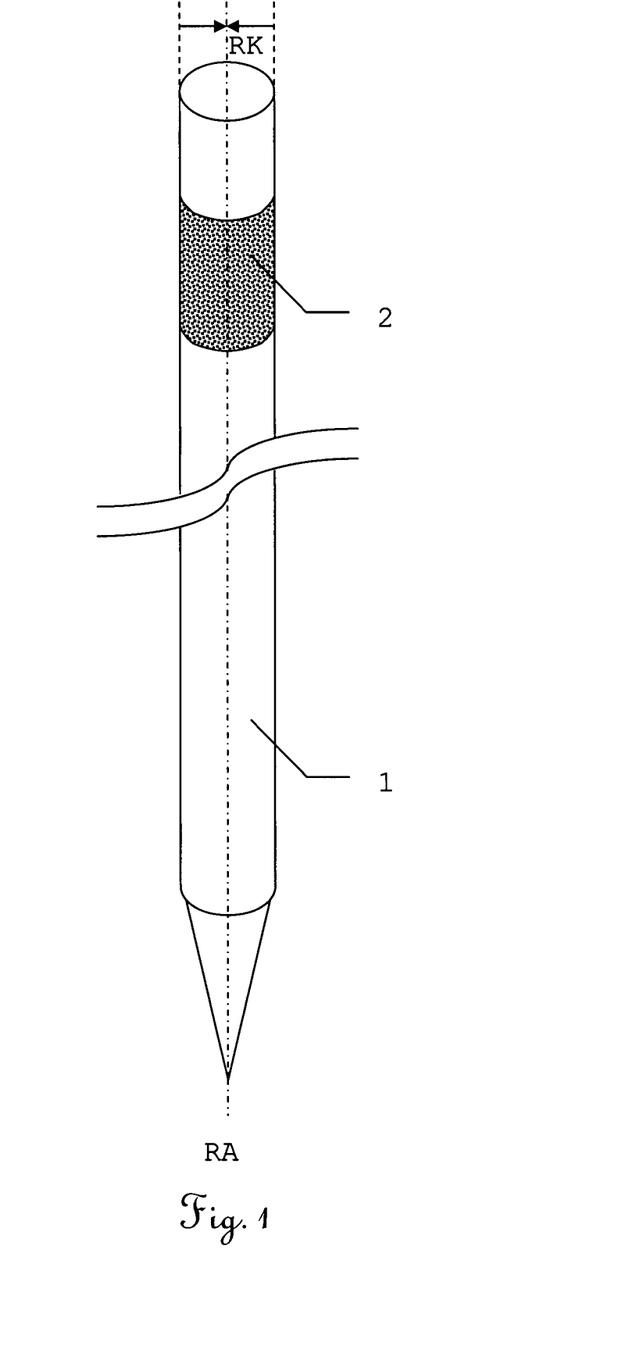
FIG. 1 shows an example of a reflector according to the prior art.

FIG. 1 shows a typical diagram of a reflector as used today for many applications. A similar arrangement is described in WO 95/30879. The reflector is in the form of a 360° reflector having reflective foil 2 arranged around a cylindrical reflector rod 1. Such reflectors are frequently used since they permit measurements from different directions—here, for example, horizontally in an angular range of 360°. The reflector is set up by means of the reflector rod 1 in a defined relationship to a target point, and measurement to it is effected. In general, the rod is set up with its pointed end above a target point. The reference axis RA or "marking axis", as a sighting axis of a distance measurement, passes through the geometrical centre of the reflector and the tip of the rod. By means of the reflective foil 2, the incident beam is substantially thrown back in the direction of incidence.

For distance measurements to the reflective foil 2 with the reference axis RA as a reference axis of the distance measurement, an addition constant or reflector constant RK has to be taken into account owing to the offset between the reference axis RA as a theoretical reference axis and a "reflection axis" as an actual reference axis. The—positive or negative—constant RK is added as a correction value to the measured time or to the distance determined.

This reflection constant RK is dependent on a plurality of factors. It is dependent firstly on the distance between reflective foil 2 and reference axis RA and secondly on the three-dimensional shape and orientation of the area illuminated by the laser beam relative to the measuring beam. The reflection position is effectively the area centre of gravity weighted with the measuring radiation. This may be present next to, before or behind the reference axis RA. Although in this case an offset is dependent on the setup, the distance between the reflection position and the reference axis RA is designated as the addition constant. Furthermore, there is a certain spatial dimension perpendicular to the area even in the case of substantially planar reflectors, such as the reflective foil 2. For a certain emission wavelength, the transit time of the measuring radiation in the reflector material is dependent on the dimension/thickness and shape of the material, and on the type thereof—characterised by the refractive index.

Figure 2:
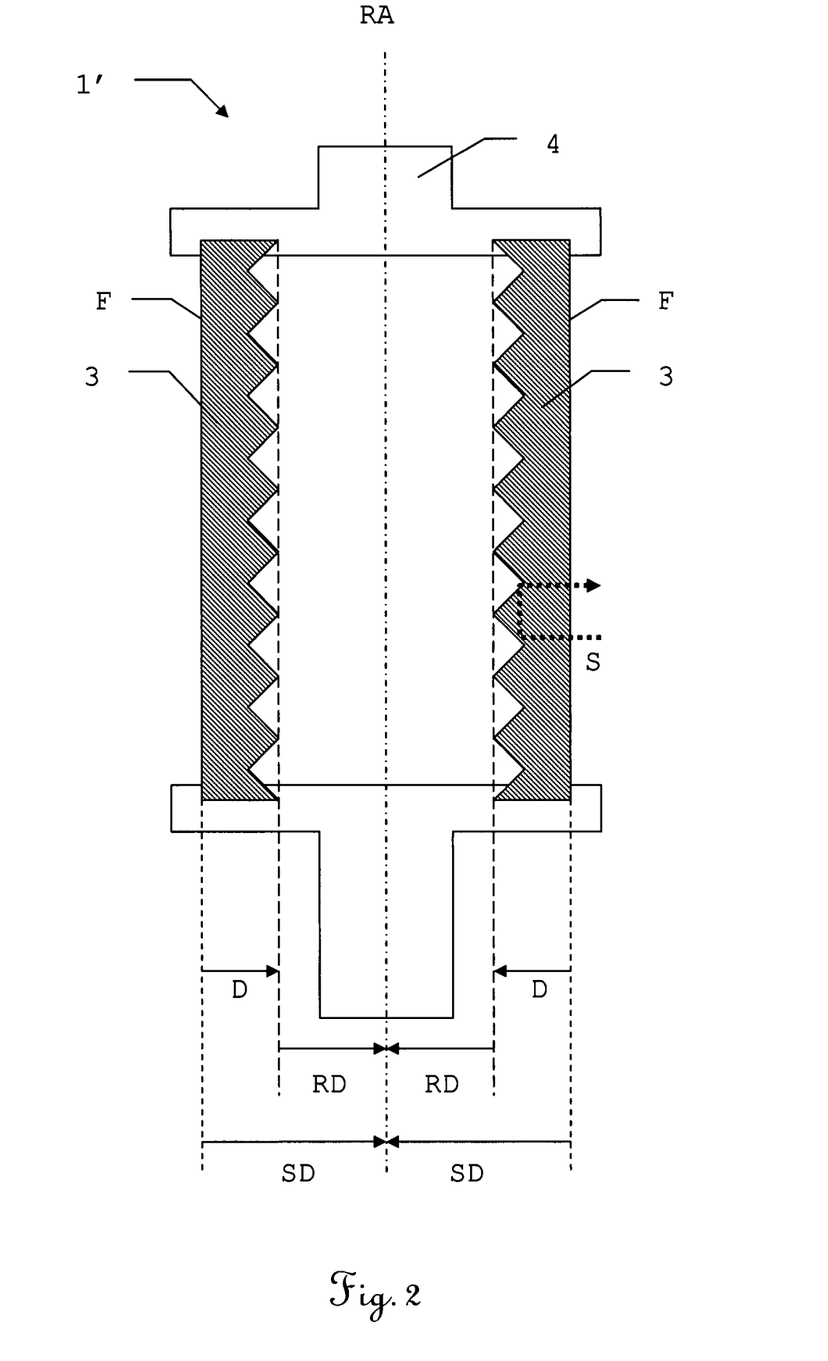
FIG. 2 schematically shows an embodiment of a reflector according to the invention having two identical reflection elements.

FIG. 2 shows an embodiment of a two-sided reflector 1' according to the invention, which has two identical reflection elements with identical addition constants. The reflection elements are arranged by means of a mount 4 of a frame—not shown in the view—relative to the reference axis RA of the reflector 1'. The two reflection elements are in the form of cat's eye reflectors 3 whose two passage areas F are arranged parallel to the reference axis RA and to one another. The structure of the cat's eye reflectors 3 consists of many small pyramidal mirrored indentations of a plastic surface. The structures can of course be ground or formed just as precisely from or in glass or other materials. The structures of the cat's eyes have the property of transmitting incident beams back in the direction of incidence. Such retroreflective components facilitate the detection of a reflected beam. In particular, the latter can be detected by a receiver arranged coaxially with the transmitter. For example, a distance value can then be determined in a known manner by means of the signal transit time.

According to the invention, the reflection 1' is now formed in such a way that the two cat's eye reflectors 3 are arranged as first and second reflection components relative to the reference axis RA so that the sum of reflector thickness D and of reflector spacing RD of the respective reflection components from the reference axis RA corresponds to the signal spacing SD of the respective signals S. The signal spacing SD is to be understood as meaning the spacing corresponding to the transit time of the signals S in air. Here, the signal S is in particular an infrared laser beam. The signal S incident on the cat's eye reflector 3 passes through the passage area F, covers a path dependent on the thickness D and structure of the material in the reflector material of thickness D, and leaves the cat's eye reflector 3 as a reflected signal. Owing to the development and arrangement of the cat's eye reflector 3 according to the invention, the transit time of the signal S in the material corresponds to twice the transit time of the signal S between passage area F and reference axis RA of the reflector in air. The transit time of the signal S received by means a receiving device and reflected by the cat's eye reflector 3 therefore corresponds to the transit time of a signal of the same wavelength reflected at the position of the reference axis RA—or of a plane of the reference axis RA. The distance measurement can therefore be related to the reference axis RA without intermediate correction, i.e. analogously to a distance measurement to a natural target object. Erroneous distance measurements due to confusion of target-type configurations or omission of the corresponding offset correction are thus avoided.

Such a reflector 1' having two identical cat's eye reflectors 3 is suitable in particular for applications in which a target point or the reflector 1' is measured from two opposite directions, such as, for example, in road or tunnel construction.

A further development of the embodiment envisages forming the reflectors or the reflection components so as to be rotatable about the reference axis RA. For example, the reference axis RA is formed as a shaft about which the reflection elements—or optionally a frame coordinated with the reflection elements—are rotatably mounted. Thus, the reflection elements can be rotated horizontally—preferably through 360°—and can be measured from different horizontal directions. In order to maintain a predetermined position, a fixing device can be provided or simply mounting with frictional locking. Furthermore, a reflector frame can be formed in such a way that reflection elements can be inserted into the frame and removed from it. Thus, for example, it is possible to change between highly reflective and more weakly reflective elements depending on requirements.

Figure 3:
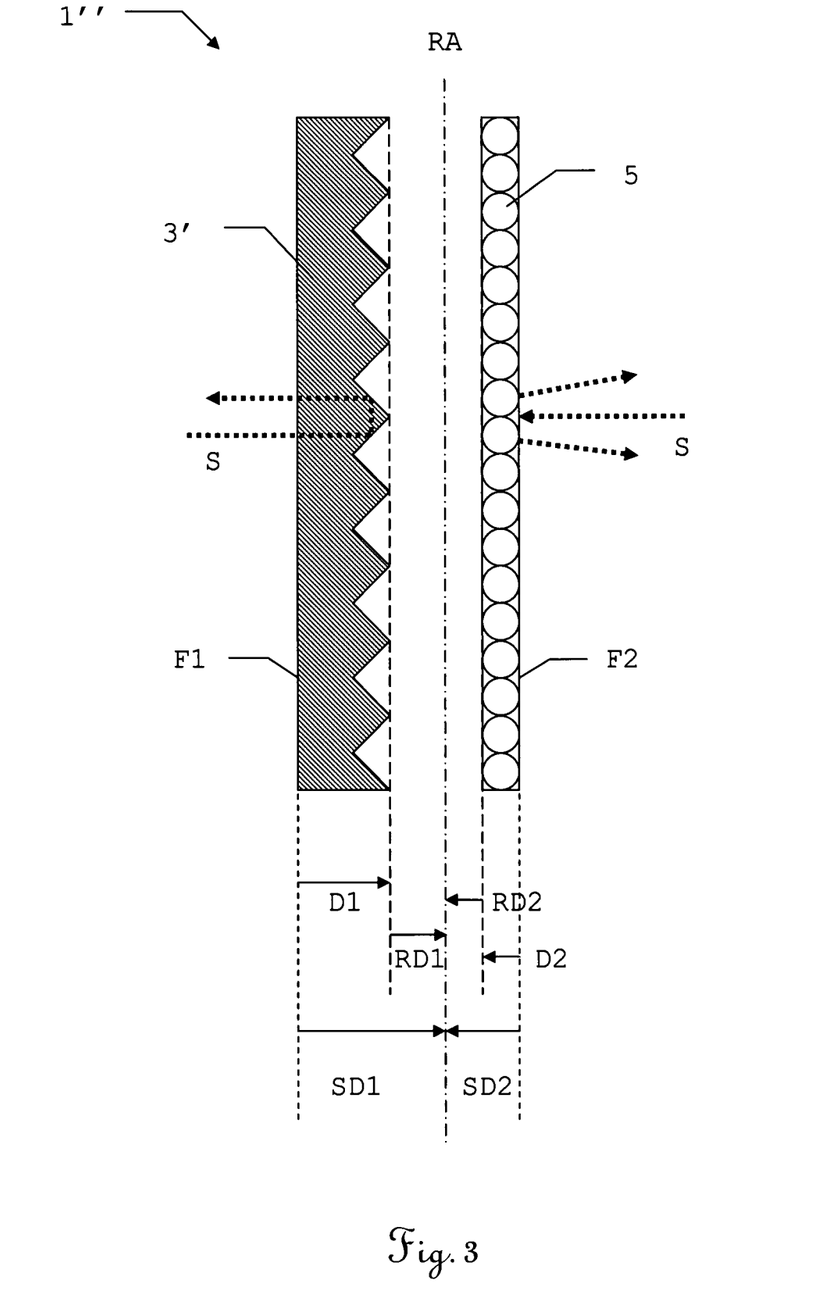
FIG. 3 schematically shows an embodiment of a reflector according to the invention having two different reflection elements.

The diagram of FIG. 3 shows a second embodiment of a two-sided reflector 1" according to the invention comprising two different reflection elements. The first reflection element is a cat's eye 3' having a layer of thickness D1 of structures ground in glass, it of course also being possible to use cat's eyes having structures injection moulded in plastic. The second reflection element is a reflection foil having a layer of thickness D2 of stochastically distributed, small glass spheres 5. The small glass spheres 5 reflect the incident signal S with little scattering, for example of 0.2° to 1°, in the direction of incidence. The passage areas F1, F2 of the two reflection elements are in turn arranged substantially parallel to one another and to the reference axis RA. According to the invention, the arrangement is such that absolute addition constants of zero result for both sides of the reflector 1'. In this working example, owing to the different materials and layer thicknesses, the reflection foil is arranged somewhat closer to the reference axis RA than the cat's eye 3'. For both sides, it is true that the respective signal spacing SD1, SD2 corresponds to the respective transit time in the materials of thicknesses D1, D2. The time difference between entrance and exit of the signal S through the passage areas F1, F2 of the layers thus corresponds to the transit time of the signal S in air from the passage area F1, F2 via the reference axis RA to the passage area F1, F2. In order to achieve this property, variable parameters of the respective reflection elements are, for example, layer thickness, beam guidance in the layer, refractive index of the layer and layer distance RD1, RD2 from the reference axis RA.

The reflector 1" therefore has an absolute addition constant of 0 mm on both sides—both on the side with the reflection foil reflection element and on the side with the cat's eye reflection element, thus corresponding so to speak to the surface of a natural target at the position of the reference axis RA. Distance measurements based on the reference axis RA can be carried out to both surfaces without correction.

The two reflection elements have different reflection behaviour. The strength of the signal reflected back can be influenced by the formation of the reflection elements. Thus, the reflection of the reflection foil is weaker than the reflection of the retroreflective glass triple prism of the cat's eye 3' by a factor of about 100. Consequently, a reflector 1" which can be used for measurements at both close range and remote range is realised. For measurements over short distances, the more weakly reflecting foil side is oriented towards the measuring device instead of the cat's eye side. By providing two surfaces having different reflectivity, the measurements can be carried out with one signal S of the same wavelength/intensity. By measurement to a highly reflective target in the remote range and to a more weakly reflective target at close range, the received signals are approximately in the same dynamic range of a receiver. Accuracies of measurement in the sub-mm range are achievable thereby. With the use of visible laser radiation, the delimited signal dynamics additionally have the advantage that the "measuring spot" of the radiation on the reflector is perceptible for a user with balanced brightness and does not dazzle said user, especially at close range. Since devices having a single radiation source and a single, in particular diffraction-limited, beam divergence can be used in combination with the reflector according to the invention, the "measuring spot" and hence the spatial accuracy of the sighting of the centre of the reflector can be checked and incorrect measurements in the case of incorrect sightings can be avoided.

It is self-evident that the chosen reflectivity ratio of the reflection elements may correspond to the desired application or may be tailored according to transmitter/receiver. Furthermore, the reflector can be formed and can be equipped with exchangeable reflection elements, for example with different reflectivity. The two-sided reflector according to the invention could be upgraded and converted, for example, with a set of exchangeable reflection elements, for example with snap mount.

It is just as possible to provide exchangeable reflection elements having further properties, for example coloured elements. Since, for example, the visibility of red laser radiation on a red-coloured reflection element is substantially increased, such a coloured element can advantageously be used, in particular in strong daylight.

Figures 4A, 4B:
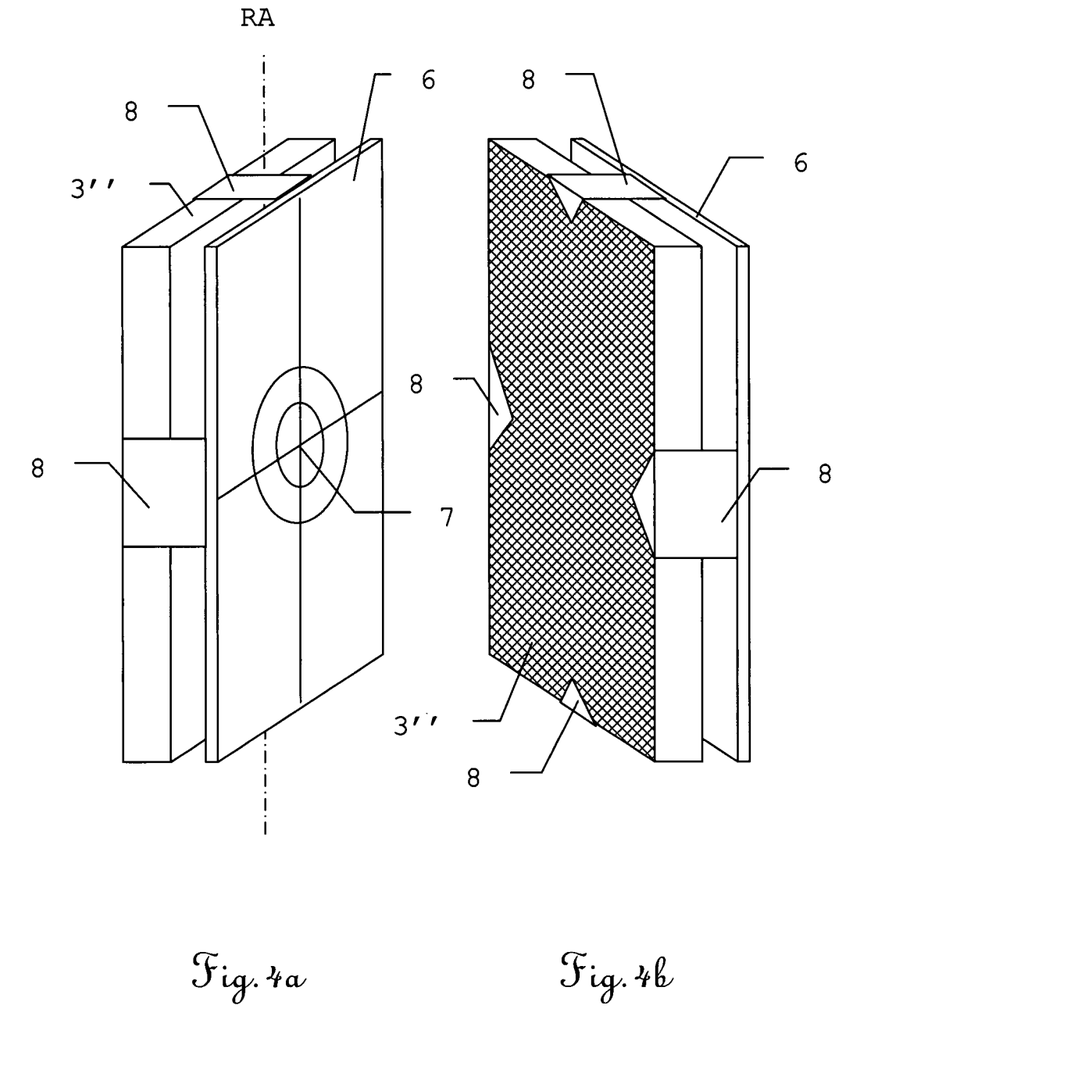
FIG. 4 shows, in two partial figures, an embodiment of a two-sided target object according to the invention.

FIGS. 4a and 4b show a two-sided target object having a reflector of the type as shown schematically in FIG. 3, in two three-dimensional views. FIG. 4a shows one side of the target object with reflective foil 6. Here, lines and circles for precise marking of the target centre 7, mainly for close distances, are also applied to the foil 6.

FIG. 4b shows the other side of the target object having a cat's eye 3". Marking elements 8—a central marking element 8 on each of the four sides of the rectangular reflector area for determining the centre of the reflector for long distances—are also coordinated with said cat's eye. The marking elements 8 furthermore serve as frame holders, in this case with a snap lock, for a frame coordinated with the reflection elements. The target object is arranged around the reference axis RA.

A further development of the embodiment envisages mounting the reflection elements or the target object around at least one axis of rotation, optionally two axes of rotation. Mounting of the arrangement around one vertical first axis, preferably parallel to the passage areas of the reflection elements and through the connecting line between the centres of gravity of the two passage areas, represents the function of a unit which is azimuthally rotatable about, for example 360° and can be measured from all horizontal directions. A particular advantage of this embodiment of the two-sided reflector is the measurement from two opposite directions; this plays an important role in particular in alignment tasks, traverses in roads or in the case of tunnel constructions, where the measuring task is particularly strongly associated with lines. On erection in the centre of road intersections two opposite road directions are covered, and the other horizontal angles are also accessible with a single rotation of the azimuthally rotatable unit through 90 degrees. All horizontal directions can therefore be measured with a single manipulation, which leads to a considerable time saving during use. The mounting about a horizontal second axis perpendicular to the first axis of rotation, for example also parallel to the passage areas and intersecting the first axis of rotation, permits measurement from different heights/vertical angles. In this case, the point of intersection of the orthogonal axis is the marking point of the measured distance with addition constant 0 mm.

Figure 5A:
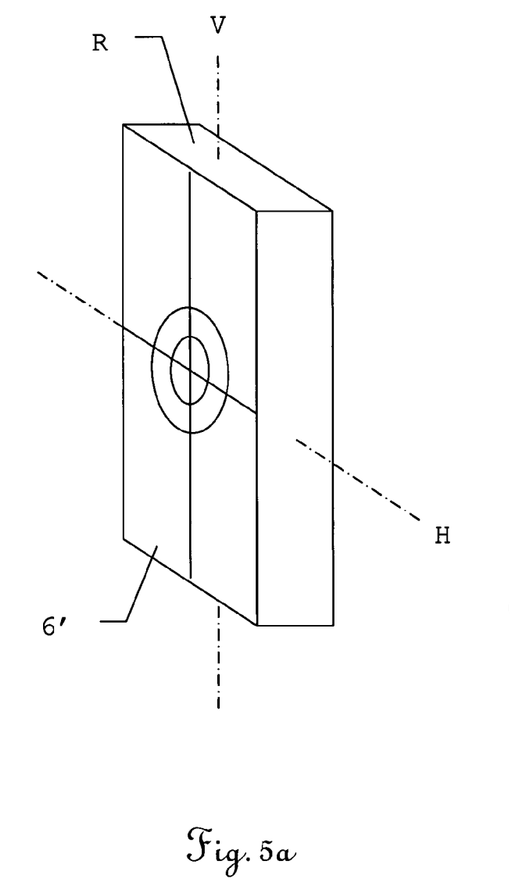
FIG. 5 shows, in two partial figures, an embodiment of a target object according to the invention, which is rotatable about two axes of rotation.
Figure 5B:
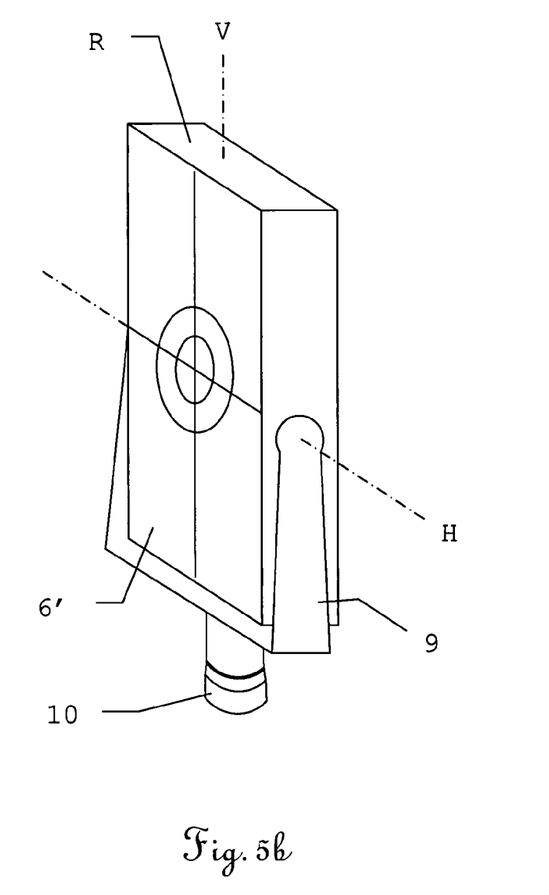

FIG. 5 shows, in two partial FIGS. 5a and 5b, a target object having reflection elements arranged in or on a frame R. In the view shown, only the second reflection element—reflection foil 6' with attached target mark—is shown. The first reflection element is, for example, a cat's eye analogous to the diagrams of FIGS. 3 and 4b. If the reflection foil 6' has a low reflectivity, e.g. 50 cd/lx/m$^2$, the second reflection element can also be in the form of a reflection foil having high reflectivity, e.g. 5000 cd/lx/m$^2$.

FIG. 5a outlines a horizontal axis of rotation H and a vertical axis of rotation V of the target object. The two axes of rotation pass in each case through the geometrical centre of gravity of the target object or of the frame R and intersect one another on a connecting line through the centres of gravity of the areas of the reflection elements, and furthermore the plane of the point of intersection of the axis is parallel to the two planes of the passage areas. The axes may also be passed through the centre of mass of the target object in order to permit stable position/erection thereof which is balanced with regard to gravitational force.

FIG. 5b shows a possible embodiment of a rotatably mounted target object. For rotatable mounting about the horizontal axis of rotation H, the frame R of the target object is rotatably mounted in a holder 9. Holder 9 and frame R are formed in such a way that the frame R can be fixed in a desired position, for example by means of a slip clutch. The rotation about the vertical axis is permitted by an adaptor 10 connected to the holder 9 and having a sliding bearing. With the adaptor 10, the target object can also be mounted, for example, rotatably on a tripod.

The invention claimed is:

1. A two-sided geodetic reflector for reflection of a diffraction-limited optical beam, comprising:
    a planar first reflection element comprising a material having a first refractive index and a first passage area for the beam; and
    a planar second reflection element comprising a material having a second refractive index and a second passage area for the beam, the first and second reflection elements being arranged relative to a reference axis and the reference axis passing between first and second reflection elements, the first and the second reflection elements having a first and a second addition constant, respectively, wherein the transit time of the beam within the first and second material corresponds to twice the transit time of the beam in air from the first and second passage area to the reference axis.

2. A two-sided reflector according to claim 1, wherein the first and/or the second reflection element is formed in such a way that the beam is homogenised on reflection by a multiplicity of reflection points.

3. A two-sided reflector according to either of claim 1, wherein the first and/or the second reflection element has a multiplicity of prisms or triple prisms.

4. A two-sided reflector according to claim 1, wherein the first and/or the second reflection elements are in the form of plastic injection molded parts.

5. A two-sided reflector according to claim 1, wherein both reflection elements are in the form of retroreflectors.

6. A two-sided reflector according to claim 1, wherein the second reflection element has a reflectivity which is weaker by at least one order of magnitude than that of the first reflection element.

7. A two-sided reflector according to claim 1, wherein the two reflection elements are identically formed as reflection foil or cat's eye.

8. A two-sided reflector according to claim 1, wherein the first reflection element comprises a cat's eye and the second reflection element comprises a reflection foil.

9. A two-sided reflector according to claim 1, wherein the two reflection elements are indirectly or directly mounted so as to be rotatable about a first and/or second axis of rotation.

10. A two-sided reflector according to claim 9, wherein the first axis of rotation intersects the second axis of rotation perpendicularly, the point of intersection of the axes of rotation being substantially on the connecting line between the centers of gravity of the two passage areas.

11. A two-sided reflector according to claim 1, wherein a frame for the reflection elements is coordinated with the reflector.

12. A two-sided target object having a two-sided reflector according to claim 1, wherein a plurality of marks, via which a target center can be determined, are indirectly or directly coordinated with the reflection elements.

13. A two-sided target object according to claim 12, wherein the target center is substantially on the connecting line through the centers of gravity of the two passage areas.

14. A two-sided reflector according to claim 1, wherein the first and second reflection elements include the first and second areas oriented parallel to one another and parallel to the reference axis.

15. A two-sided reflector according to claim 1 configured for use with geodetic, structural and industrial surveying using rangefinders designed for reflectorless measurement.

16. A method of marking targets in geodetic or construction surveying tasks comprising:
    marking targets in geodetic or construction surveying tasks using the two-sided reflector according to claim 1.

* * * * *